(12) United States Patent
Dai

(10) Patent No.: US 11,918,175 B2
(45) Date of Patent: Mar. 5, 2024

(54) CONTROL METHOD FOR CARPET DRIFT IN ROBOT MOTION, CHIP, AND CLEANING ROBOT

(71) Applicant: AMICRO SEMICONDUCTOR CO., LTD., Guangdong (CN)

(72) Inventor: Jianfeng Dai, Guangdong (CN)

(73) Assignee: AMICRO SEMICONDUCTOR CO., LTD., Guangdong (CN)

(*) Notice: Subject to any disclaimer, the term of this patent is extended or adjusted under 35 U.S.C. 154(b) by 411 days.

(21) Appl. No.: 17/288,002

(22) PCT Filed: Dec. 19, 2018

(86) PCT No.: PCT/CN2018/121963
§ 371 (c)(1),
(2) Date: Apr. 23, 2021

(87) PCT Pub. No.: WO2020/082552
PCT Pub. Date: Apr. 30, 2020

(65) Prior Publication Data
US 2021/0401251 A1 Dec. 30, 2021

(30) Foreign Application Priority Data
Oct. 23, 2018 (CN) .......................... 201811240370.7

(51) Int. Cl.
*A47L 9/28* (2006.01)
*A47L 9/00* (2006.01)
(Continued)

(52) U.S. Cl.
CPC ............. *A47L 9/2852* (2013.01); *A47L 9/009* (2013.01); *A47L 9/2805* (2013.01); *G01C 19/00* (2013.01);
(Continued)

(58) Field of Classification Search
CPC ...... A47L 9/2852; A47L 9/009; A47L 9/2805; A47L 2201/04; A47L 2201/06;
(Continued)

(56) References Cited

U.S. PATENT DOCUMENTS 6,963,185 B2 * 11/2005 Takenaka ............... B62D 57/02
901/1
9,427,875 B2 * 8/2016 Goel ...................... B25J 9/1664
(Continued)

FOREIGN PATENT DOCUMENTS

CN 102666032 A 9/2012
CN 105717924 A 6/2016
(Continued)

OTHER PUBLICATIONS

The European Search Report of family patent EP application dated Jul. 1, 2022.
(Continued)

*Primary Examiner* — Khoi H Tran
*Assistant Examiner* — Nhi Q Bui
(74) *Attorney, Agent, or Firm* — Yu Gang

(57) ABSTRACT

A control method for carpet drift in robot motion, a chip, and a cleaning robot are disclosed. The control method includes: performing fusion calculation on a current position coordinate of the robot according to data sensed by a sensor every first preset time, calculating amount of drift, relative to a preset direction, of the robot, according to a relative position relationship between a current position and an initial position of the robot, and accumulating to obtain a drift statistical value; and calculating the number of acquisitions of the position coordinate within a second preset time, averaging to
(Continued)

Fig. 1 obtain a drift average value, determining a state of the robot deviating from the preset direction according to the drift average value, and setting a corresponding Proportion Integration Differentiation (PID) proportionality coefficient to synchronously adjust speeds of left and right drive wheels of the robot while reducing a deviation angle of the robot.

20 Claims, 5 Drawing Sheets

(51) Int. Cl.
  *G01C 19/00* (2013.01)
  *G05B 6/02* (2006.01)
  *G05D 1/00* (2006.01)

(52) U.S. Cl.
  CPC .............. *G05B 6/02* (2013.01); *G05D 1/0223* (2013.01); *G05D 1/0231* (2013.01); *A47L 2201/04* (2013.01); *G05D 2201/0215* (2013.01)

(58) Field of Classification Search
  CPC .............. A47L 2201/00; A47L 11/4011; A47L 11/4061; A47L 11/32; A47L 11/40; A47L 11/4008; A47L 13/16; G05D 1/0223; G05D 1/0231; G05D 1/0253; G05D 1/0272; G05D 2201/0215; G05D 2201/0203
  See application file for complete search history.

(56) References Cited

U.S. PATENT DOCUMENTS

| | | | |
|---|---|---|---|
| 2006/0253224 A1* | 11/2006 | Tani | G05D 1/0242 |
| | | | 701/23 |
| 2006/0293809 A1 | 12/2006 | Harwig et al. | |
| 2011/0125323 A1 | 5/2011 | Gutmann et al. | |
| 2012/0219207 A1* | 8/2012 | Shin | G05D 1/0272 |
| | | | 901/50 |
| 2012/0271502 A1 | 10/2012 | Lee et al. | |
| 2013/0054026 A1 | 2/2013 | Jang et al. | |
| 2016/0082597 A1* | 3/2016 | Gorshechnikov | G06V 10/462 |
| | | | 901/1 |
| 2016/0144511 A1 | 5/2016 | Romanov et al. | |

FOREIGN PATENT DOCUMENTS

| | | |
|---|---|---|
| CN | 105792720 A | 7/2016 |
| CN | 106289327 A | 1/2017 |
| CN | 107336267 A | 11/2017 |
| CN | 108638053 A | 10/2018 |
| JP | 2005141636 A | 6/2005 |
| JP | 200859218 A | 3/2008 |
| JP | 5184489 B2 | 4/2013 |
| JP | 2017536871 A | 12/2017 |
| JP | 2018500624 A | 1/2018 |
| WO | 2013071190 A1 | 5/2013 |
| WO | 2013185102 A1 | 12/2013 |

OTHER PUBLICATIONS

The first office action of family patent JP application dated Apr. 12, 2022.

* cited by examiner

CONTROL METHOD FOR CARPET DRIFT IN ROBOT MOTION, CHIP, AND CLEANING ROBOT

CROSS-REFERENCE TO RELATED APPLICATIONS

The present disclosure takes the Chinese Patent Application No. 201811240370.7, filed on Oct. 23, 2018, and entitled "control method for carpet drift in robot motion, chip, and cleaning robot", as the priority, the entire contents of which are incorporated herein by reference.

TECHNICAL FIELD

The disclosure relates to the field of control in robot detection, and particularly to, a control method for identifying a direction and a magnitude of carpet drift and compensating the carpet drift in robot motion, a chip and a cleaning robot.

BACKGROUND

A robot based on inertial navigation always navigates back to a charging base according to a global grid map. This mode is carried out by assuming that the global map is relatively accurate. However, for many conventional autonomous robots, positions and/or poses of the robots are not properly or accurately determined, and movements of the robots are not properly controlled, so that it cannot be ensured that the robots stay on given routes and/or reach designated positions and/or poses, resulting in incorrect results of position calculation of the robots. For example, the trajectory of an autonomous cleaning device may be disturbed by influence of the carpet grain. Effects of the carpet grain on motion of an object may be referred to as carpet drift. The carpet drift may be represented by a carpet drift vector, which has both a magnitude and a direction. The carpet drift vector may be a property of a carpet.

When a robot navigates in a carpeted environment, the motion of the robot is not only pushed by a friction force, but also affected by an acting force applied to the robot from the carpet. Based on the motion of the robot relative to the carpet grain, drive wheels of the robot can make carpet fibers stand up or fall down. In particular, when the fibers fall down along the carpet grain, the carpet can push or guide the robot in the direction of the carpet grain. As shown in FIG. 3, when a robot 1 on the left moves to an arrow direction C, a drive wheel A of the robot 1 is pushed by a friction force f11, the carpet fibers apply an inward acting force FH to the drive wheel A of the robot 1, so that the robot 1 deviates from the arrow direction C during the motion under a resultant force F12 of the friction force f11 and the inward acting force FH. As shown in FIG. 3, when a robot 2 on the right moves to the arrow direction C, a drive wheel B of the robot 2 is pushed by a friction force f21, the carpet fibers apply an outward acting force F21 to the drive wheel B of the robot 2, so that the robot 2 deviates from the arrow direction C during the motion under a resultant force F22 of the friction force f21 and the outward acting force F21. Hence, the position estimate error can accumulate over time as the robot traverses the carpet. Accordingly, the robot may not be able to build an accurate map of the environment or may not be able to navigate the environment efficiently, accurately, and/or safely for carrying out tasks such as vacuuming.

Generally, an optical flow sensor may be considered to be used in the industry to eliminate influence of the carpet. Although the optical flow sensor guarantees position accuracy of the robot, it cannot guarantee motion regularity of the robot, and cannot guarantee to eliminate influence of direction anisotropy of the carpet.

SUMMARY

A control method for carpet drift in a robot motion is disclosed. A robot begins to linearly move on a carpet surface from an initial position. Coordinates sensed by the robot are required to be converted into a global coordinate system. The control method includes: S1, determining a preset direction in which the robot linearly moves on the carpet surface, herein the preset direction is a positive direction of a preset coordinate axis of the global coordinate system, simultaneously recording an initial position coordinate and an initial moment of the robot, and entering S2; S2, performing, every a first preset time, fusion calculation on data sensed by an optical flow sensor and data sensed by code disks at the same time, to obtain a current position coordinate of the robot, which corresponds to an actual advancing distance of drive wheels of the robot, and entering S3; S3, according to a relative position relationship between the current position coordinate and the initial position coordinate of the robot, calculating amount of drift, relative to a preset direction, of the robot, then accumulating to obtain a drift statistical value, and entering S4, and the amount of drift refers to a vertical distance between the current position of the robot and a straight line where the preset direction lies in; S4, determining whether a difference value between a current moment and the initial moment is greater than a second preset time or not, if yes, entering S5, otherwise, returning to S2; S5, based on a time interval of data sensing at the first preset time, calculating the number of acquisitions of the position coordinate within the second preset time, using the drift statistical value to average the number of acquisitions to obtain a drift average value as the amount of carpet drift, and a positive and a negative of the drift average value is related to a coordinate axis direction from which the robot deviates in the global coordinate system, and the drift average value determines a magnitude of a current motion direction of the robot deviates from the preset direction; after that, entering S6; S6, according to a difference value corresponding to an absolute value of the drift average value, setting a corresponding PID proportionality coefficient to synchronously adjust a speeds of left drive wheel of the robot and a speed of right drive wheel of the robot, so that the robot is corrected from the current motion direction to the preset direction to continue to linearly move. The amount of drift, the drift statistical value, and the number of acquisitions are all initialized to be zero at the initial moment; the first preset time refers to a time for each fusion calculation; the second preset time refers to a detection time to determine carpet drift occurred to the robot; and both the coordinates of the initial position and the current position of the robot are global coordinates.

The control method further includes, according to an angle change of a gyroscope, determining a drift angle and a drift direction of the robot on a carpet surface, namely an angle difference measured at the current position coordinate and the initial position coordinate.

Further, before S1 is executed, the speed of the left drive wheel of the robot is equal to the speed of the right drive wheel thereof.

Further, At S2, a process of the fusion calculation includes: when the data sensed by the optical flow sensor is reliable, first converting an image displacement acquired by the optical flow sensor in each first preset time into a displacement of a same dimension as the code disks, and accumulating and integrating the data sensed by the optical flow sensor on time dimension to obtain an optical flow drift position coordinate of the optical flow sensor relative to an initial position of the optical flow sensor; then transferring the optical flow drift position coordinate to obtain a machine center coordinate of the current position according to a rigid connection relationship between the optical flow sensor and a robot center, namely the current position coordinate of the robot, which corresponds to an actual advancing distance of the drive wheels of the robot on the carpet; when the data sensed by the optical flow sensor is not reliable, integrating pulse data sensed by the code disks within each first preset time on the time dimension, and using a calculation result to update a machine center coordinate, so that obtaining the current position coordinate of the robot, which corresponds to an actual advancing distance of the drive wheels of the robot on the carpet; moreover, transferring the machine center coordinate according to a rigid connection relationship between the optical flow sensor and the robot center, and using a translated coordinate to update an optical flow drift position coordinate; and a reliability of the data sensed by the optical flow sensor is determined by a built-in drive signal of the optical flow sensor; when an interrupt signal output by the optical flow sensor is at a high level, the data sensed by the optical flow sensor is reliable; and when the interrupt signal output by the optical flow sensor is at a low level, the data sensed by the optical flow sensor is unreliable.

Further, the rigid connection relationship refers to a relative position relationship between an optical flow coordinate system of the optical flow sensor and a machine coordinate system of the robot center, and includes a distance between a position of the optical flow sensor and a robot center position, and an included angle between a line from the position of the optical flow sensor to the position of the robot center, and a preset coordinate axis of the machine coordinate system, and the positive direction of the preset coordinate axis of the machine coordinate system is the current motion direction of the robot; an included angle between the positive direction of the preset coordinate axis of the machine coordinate system and the positive direction of the preset coordinate axis of the global coordinate system is obtained by calculation based on detection values of the gyroscope, and is used as a deviation angle of the robot at the current position relative to the preset direction.

Further, At S5, the number of acquisitions refers to a ratio of the second preset time to the first preset time.

Further, when the drift average value is a positive number, a process of synchronously adjusting the speed of the left drive wheel and the speed of right drive wheel of the robot comprises: the speed of the left drive wheel of the robot is controlled to plus the absolute value of the drift average value, the speed of the right drive wheel of the robot is controlled to minus the absolute value of the drift average value, and the robot is controlled to detect the drift average value in real time; until the drift average value gradually decreases and tends to 0, the current motion direction of the robot and the preset direction gradually coincide, and the speed of the left drive wheel of the robot is equal to that of the right drive wheel of the robot again; when the drift average value is a negative number, a process of synchronously adjusting the speed of the left drive wheel and the speed of right drive wheel of the robot comprises: the speeds of the left drive wheel of the robot is controlled to minus the absolute value of the drift average value, the speed of the right drive wheel of the robot is controlled to plus the absolute value of the drift average value, and the robot is controlled to execute the identification method; until the drift average value gradually decreases and tends to 0, the current motion direction of the robot and the preset direction gradually coincide, and the speed of the left drive wheel of the robot is equal to that of the right drive wheel of the robot again.

A chip is configured to store a program. The program is configured to control the robot to execute the control method.

DETAILED DESCRIPTION OF THE EMBODIMENTS

Figure 1:
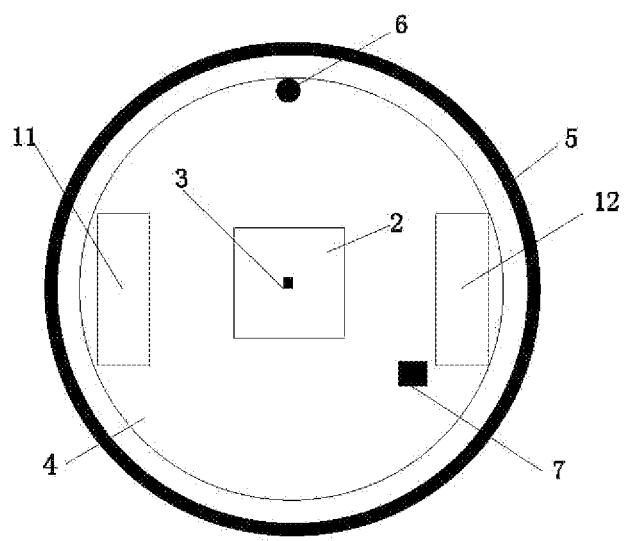
FIG. 1 is a schematic diagram of a structural model of a robot in embodiments of the disclosure.

The technical solutions in the embodiments of the disclosure will be described below in combination with the drawings in the embodiments of the disclosure. It is to be understood that the specific embodiments described below are merely intended to explain the disclosure and not limit the disclosure.

In the descriptions of the disclosure, it is to be understood that orientation or position relationships indicated by terms "center", "longitudinal", "transverse", "up", "down", "front", "back", "left", "right", "vertical", "horizontal", "top", "bottom", "inner", "outer" and the like are orientation or position relationships shown in the drawings, are adopted not to indicate or imply that indicated devices or components must be at specific orientations or structured and operated at specific orientations but only to conveniently describe the disclosure and simplify descriptions and thus should not be understood as limits to the disclosure.

It is to be noted that relational terms such as "first" and "second" are only adopted to distinguish one entity or operation from another entity or operation, and are not necessarily required or implied that there is any such actual relationship or order between these entities or operations.

Methods and systems are described for estimating drift, such as carpet drift. Example implementation modes are described in the embodiments of the disclosure in the context of systems and methods for estimating carpet drift experienced by a cleaning robot, but will be applicable to other types of devices, such as mobile robotic devices capable of traversing a carpeted surface. It is understood that the term carpet is intended to include rugs and other floor coverings that may have a grain or nap. The direction-dependent forces of the carpet due to the carpet grain acting upon a moving object can influence the motion of the object.

A robot carrier provided by the embodiments of the disclosure is equipped with a gyroscope configured to detect a rotation angle, an odometer configured to detect a travel distance, and a sensor that can detect a distance from a wall. The sensor that can detect the distance from the wall may be an ultrasonic distance sensor, an infrared intensity detection sensor, an infrared distance sensor, a physical switch detection collision sensor, a capacitance or resistance change detection sensor, or the like. The robot carrier is further equipped with an optical flow sensor configured to detect a relative displacement coordinate of the robot. A mobile robot according to the disclosure is shown in FIG. 1. FIG. 1 does not represent the actual structure and appearance of the robot of the disclosure, but only represents a schematic diagram of the disclosure. The optical flow sensor is arranged on a base of the robot (which can be any position on the base). In FIG. 1, a base 4 of the mobile robot is configured to hold a left drive wheel 11 and a right drive wheel 12 that control an advancing direction of the robot. A gyroscope 3 can be disposed in any position of a control mainboard 2 of the robot, and one or more gyroscopes can be included in the control mainboard 2 to sense rotation of the robot. The control mainboard 2 can process parameters of related sensors, and output a control signal to an execution component of the robot. An optical flow module 7 can also be arranged at any position on the base 4 of the mobile robot, and the mobile robot further includes a universal wheel 6. Both the left drive wheel 11 and the right drive wheel 12 are provided with code disks configured to detect rotational speeds of the corresponding wheels. Orientation of a lens of an optical flow sensor mounted on the optical flow module 7 is parallel to the ground. The optical flow module 7 further includes a light-emitting diode (LED) that can be turned on or off automatically according to a brightness of ambient light; when the brightness of the ground is low, the LED light is turned on; and when the brightness of the ambient light is high, the LED light is turned off.

It is to be understood that carpet drift means the robot drift on the carpet.

It is to be understood that when the robot moves in the direction of the carpet grain, the robot can travel a distance greater than the distance determined based on rotations of the code disks disposed in the drive wheels. On the other hand, when the robot travels over erect fibers against the carpet grain, the robot can travel a distance less than the distance determined based on rotations of the code disks mounted in the drive wheels. In either case, the actual distance traveled by the robot can be different than the distance measured by code disks. Due to great influence of slippage of the drive wheels of the robot moving on the carpet, it is not necessary to arrange the code disks, which may be an inertial sensor that is optional. Hence, the position estimate error can accumulate over time as the robot traverses the carpet. Accordingly, the robot may not be able to build an accurate map of the environment or may not be able to navigate the environment efficiently, accurately, and/or safely, thus can not be used for carrying out tasks such as vacuum dust removal.

Figure 5:
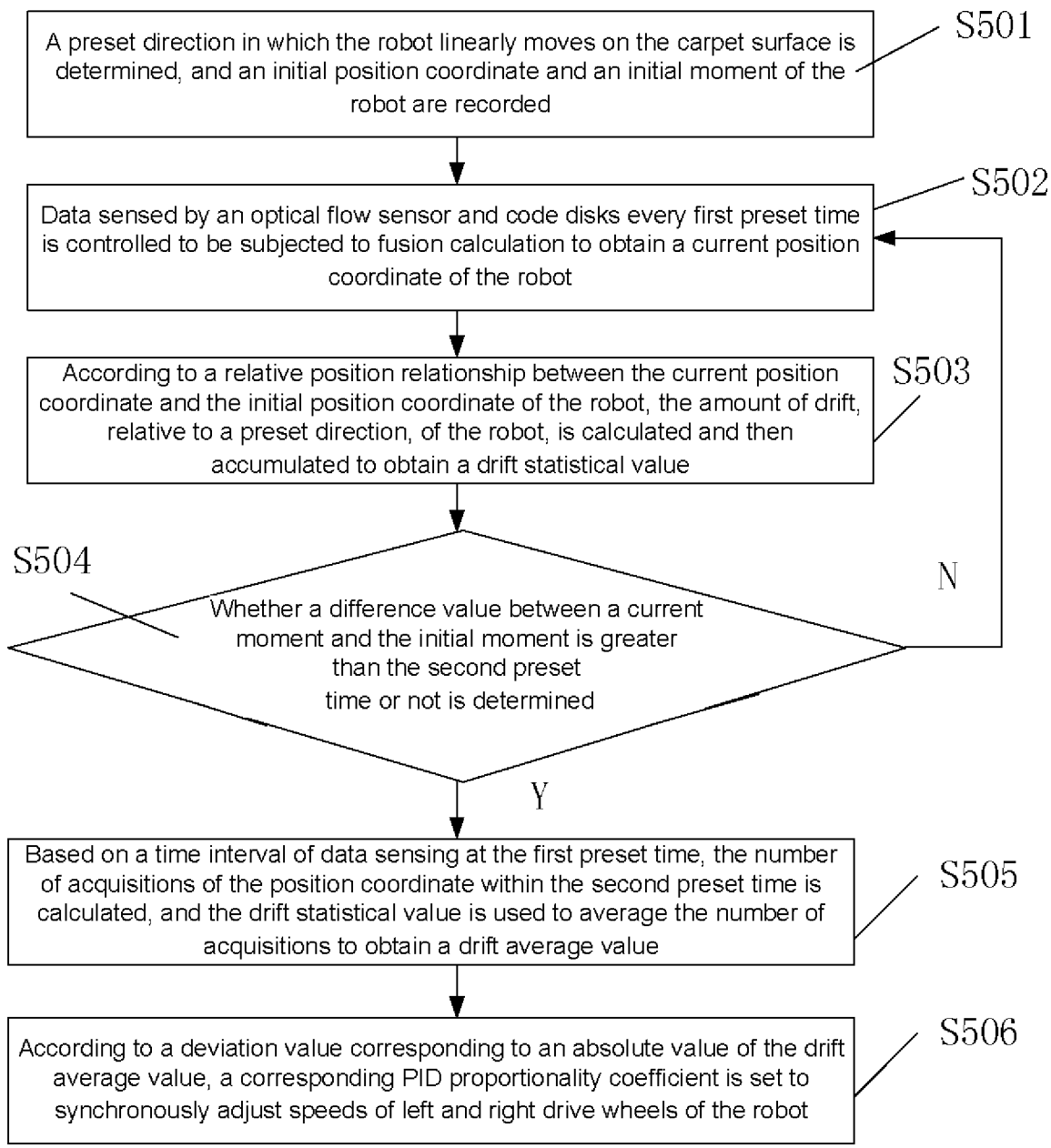
FIG. 5 is a flowchart of a control method for carpet drift in robot motion, provided by embodiments of the disclosure.

The embodiments of the disclosure provide a control method for carpet drift in robot motion, which is applied to a motion process of the robot on the carpet surface. As shown in FIG. 5, the control method includes the following steps.

At S501, when detecting the robot moving on the carpet surface, the control mainboard 2 controls the robot to linearly move along a preset direction on the carpet surface, the preset direction is a positive direction of an X-axis or Y-axis of a global coordinate system YOX; and moreover, recording of time and position coordinates of the robot is started, to obtain an initial position coordinate and an initial moment of the robot. In some embodiments of the disclosure, the robot is controlled to linearly move along the positive direction of the X-axis of the global coordinate system YOX, and the positive direction of the X-axis is an expected displacement direction of the robot. During the motion, carpet drift is caused by acting forces such as the direction of carpet grain, so that the position coordinates and recorded time variables are required to be continuously updated. S502 is then executed.

It is to be noted that a drift angel of the robot is an angle difference, between a current position and an initial position of the robot, calculated based on detection angles of the gyroscope. Before the robot executes S501, the speed of the left drive wheel of the robot is equal to that of the right drive wheel. Theoretically, if the robot wants to walk in a straight line, control speeds output to the two drive wheels should be the same. However, due to the carpet drift caused by the acting force applied by the carpet, actual walking speeds of the left drive wheel and the right drive wheel of the robot may be deviated, resulting in the robot deviating to one side of the straight line in which the robot is going to walk.

At Step S502, a current position coordinate of the robot is obtained by fusion calculation through sensors within first preset time. Specifically, data sensed by the optical flow sensor every first preset time and data sensed by the code disks at the same time are subjected to fusion calculation to obtain the current position coordinate of the robot, namely a robot center coordinate, which corresponds to an actual advancing distance of the drive wheels of the robot on the carpet, after that, S503 is executed. In some embodiments of the disclosure, the first preset time is preferably configured to be 10 ms, serving as a time interval for the sensors to sense each data. Specifically, when the robot moves, along the positive direction of the X-axis, on the carpet surface, the data sensed by the optical flow sensor within every 10 ms is subjected to integral calculation on time dimension, an optical flow coordinate system is converted to a machine coordinate system to obtain the robot center coordinate, which corresponds to a global coordinate position R0 of the robot center. The data sensed by the code disks every 10 ms is subjected to integral calculation on time dimension, the machine coordinate system is then converted to the optical flow coordinate system to obtain an optical flow drift position coordinate, namely a drift coordinate of the optical flow sensor.

It is to be noted that if the initial pose, environment, and target of the robot are known, the navigation problem is transformed into a global path planning problem. Therefore, the coordinates sensed by the code disks and the optical flow sensor of the robot are both required to be converted into the global coordinate system for fusion calculation, and the current position coordinate of the robot finally obtained is the position coordinate in the global coordinate system.

Figure 2:
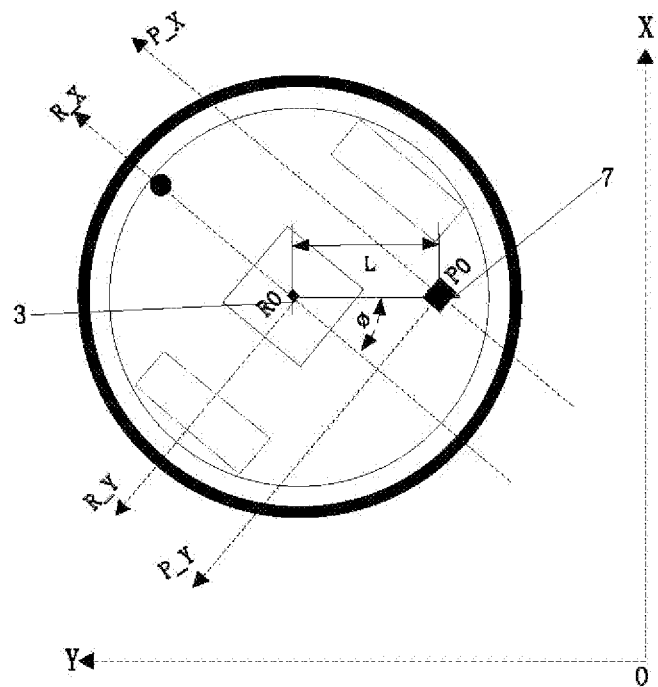
FIG. 2 is a distribution schematic diagram of a robot coordinate system, an optical flow coordinate system, and a global coordinate system of a current position in embodiments of the disclosure.

Specifically, a distribution schematic diagram of the robot coordinate system, the optical flow coordinate system, and the global coordinate system are as shown in FIG. 2. The robot coordinate system is a coordinate system which takes a center R0 of the robot at the current position as origin and takes a direction, corresponding to the advancing direction of the robot at the current position, as the positive direction of a R_X axis, and further includes a R_Y axis perpendicular to the R_X axis. The center R0 of the robot coordinate system corresponds to the gyroscope 3 disposed at the center position of the control mainboard 2 in the center of the robot.

The global coordinate system is a coordinate system which takes the initial position of the robot as the origin, takes the advancing direction of the robot from the initial position as the positive direction of the X-axis, and takes a direction perpendicular to the direction of the X-axis as the Y-axis. The optical flow coordinate system is a pixel coordinate system different from the robot coordinate system and the global coordinate system in terms of unit, and is a coordinate system that takes a center position P0 of the optical flow module 7 as the origin and has a P_X axis and a P_Y axis perpendicular to each other. The above three coordinate systems all follow the right-hand rule. The robot coordinate system and the optical flow coordinate system are both relative coordinate systems, and their origins change with the current position of the robot. In the global coordinate system, the left side of the Y-axis is a first quadrant, and other regions divided counterclockwise are a second quadrant, a third quadrant, and a fourth quadrant sequentially. An absolute value of an angle at which the robot motion direction deviates from the preset direction keeps as $\theta 1$.

Specifically, the optical flow sensor on the optical flow module 7 continuously acquires object surface images at a certain rate, pixels of the images produced are analyzed by means of the control mainboard 2 of the robot. Since two adjacent images always have the same features, by comparing position change information of these feature points, mean motion of the surface features of the object can be determined. According to the principle that the gray level of the same pixel remains unchanged and the principle that the speed of pixels in the same image area is the same, optical flow field equations are established and solved to obtain the motion speed of the pixels. Then, integral calculation is performed, so that an image displacement, acquired in the first preset time, of the robot is obtained by the integral calculation using the image feature information acquired by the optical flow sensor. The image displacement refers to a value in the optical flow coordinate system, unit of the optical flow coordinate system is required to be converted to unit of distance, and thus the image displacement is converted into a displacement of the same dimension as the code disks.

Figure 4:
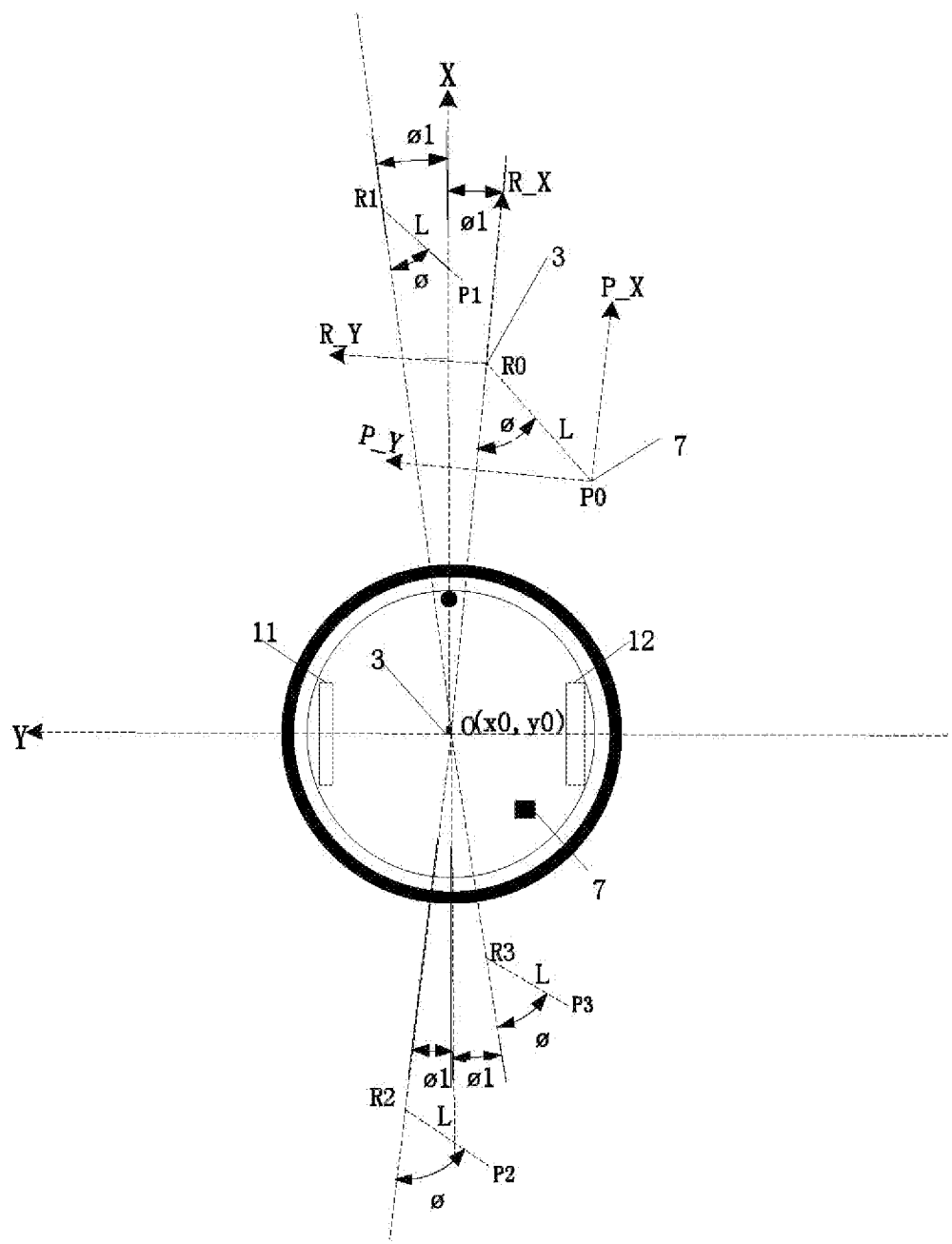
FIG. 4 is a schematic diagram of conversion between a robot coordinate system and an optical flow coordinate system in embodiments of the disclosure.

As some embodiments of the disclosure, a rigid connection relationship between the optical flow sensor and the robot center refers to a relative position relationship between the optical flow coordinate system of the optical flow sensor and the machine coordinate system of the robot center, the rigid connection relationship includes a distance between a position of the optical flow sensor and a robot center position, and an included angle between a line from the position of the optical flow sensor to the position of the robot center, and a preset coordinate axis of the machine coordinate system, wherein the positive direction of the preset coordinate axis of the machine coordinate system is the current motion direction of the robot; an included angle between the positive direction of the preset coordinate axis of the machine coordinate system and the positive direction of the preset coordinate axis of the global coordinate system is obtained by calculation based on detection values of the gyroscope, and is used as a deviation angle of the robot at the current position relative to the preset direction. As shown in FIG. 2 and FIG. 4, the relative position relationship between the origin R0 of the robot coordinate system and the origin P0 of the optical flow coordinate system is the rigid connection relationship between the optical flow sensor and an initial sensor, and includes a distance L between the origin R0 of the robot coordinate system and the origin P0 of the optical flow coordinate system, and an absolute value $\theta$ of an included angle between a line segment P0R0 and a straight line where the R_X axis of the robot lies. The relative position relationship between the robot coordinate system and the optical flow coordinate system remains unchanged during the motion of the robot to form the rigid connection relationship. The actual position of the origin R0 of the robot coordinate system corresponds to the gyroscope 3 that is disposed at the center position of the robot. The actual position of the origin P0 of the optical flow coordinate system corresponds to the optical flow module 7.

As shown in FIG. 4, a coordinate system conversion method based on the above rigid connection relationship includes: a center position R0 of the robot is in the fourth quadrant of the global coordinate system, the coordinate in the optical flow coordinate system is sensed by the optical flow sensor on the optical flow module 7, and is converted into the global coordinate system to obtain the first predicted position coordinate P0(xp4, yp4) in the fourth quadrant of the global coordinate system, that is, an angle at which the current motion direction of the robot deviates from the positive direction of the X-axis to the negative direction of the Y-axis is $\theta 1$, which is a fixed drift angle caused by the acting force of the carpet to the robot. The rotation angle $\theta 1$ of the robot can be sensed by the gyroscope 3. From trigonometric function relations, the first predicted position coordinate is subjected to translational conversion, according to the rigid connection relationship, to obtain a second predicted position coordinate of the robot at the center position, that is, a current position coordinate R0(xr4, yr4) of the robot center in the global coordinate system can be approximatively expressed by the example equations of the fourth quadrant:

$$xr4 = \frac{-yp4 + xp4 \times \tan(\theta - \theta 1)}{\tan\theta 1 + \tan(\theta - \theta 1)};$$

$$yr4 = xr4 \times \tan\theta 1.$$

A specific embodiment to which the above equations apply is: the gyroscope 3 is disposed in the center of the robot, the optical flow module 7 is disposed at the bottom right of the robot center. The optical flow drift amount measured by the optical flow sensor is converted, by the preceding coordinate system conversion method, to the current position coordinate R0(xr4, yr4) of the robot center in the global coordinate system, and an angle at which the center of gravity of the machine body deviates from an expected position (xr4, 0) of the motion is $\theta 1$.

It is to be noted that the center position of the robot further includes embodiments of the center position in the first quadrant, the second quadrant, and the third quadrant of the global coordinate system. In these embodiments, the gyroscope 3 is disposed in the center of the robot, the optical flow module 7 is disposed at bottom right of the robot center, and an expected displacement direction of the robot is the positive direction of the X-axis, that is, the preset direction is the positive direction of the X-axis.

Some embodiments of a center position R1 of the robot in the first quadrant of the global coordinate system: the first predicted position coordinate is P1(xp1, yp1), the first predicted position coordinate is subjected to translational conversion, according to the rigid body connection relationship from trigonometric function relations, to obtain a second predicted position coordinate of the position of the robot center, that is, a current position coordinate R1(xr1, yr1) of the robot center in the first quadrant of the global coordinate system is approximately expressed by the trigonometric function equations based on the fourth quadrant:

$$xr1 = \frac{yp1 - xp1 \times \tan(\theta + \theta1)}{\tan\theta1 - \tan(\theta + \theta1)};$$

$$yr1 = xr1 \times \tan\theta1.$$

Some embodiments of a center position R2 of the robot in the second quadrant of the global coordinate system: the first predicted position coordinate is P2(xp2, yp2), the first predicted position coordinate is subjected to translational conversion, according to the rigid body connection relationship from trigonometric function relations, to obtain a second predicted position coordinate of the position of the robot center, that is, a current position coordinate R2(xr2, yr2) of the robot center in the second quadrant of the global coordinate system may be approximately expressed by the following example equations:

$$xr2 = \frac{-yp2 + xp2 \times \tan(\theta - \theta1)}{\tan\theta1 + \tan(\theta - \theta1)};$$

$$yr2 = -xr2 \times \tan\theta1.$$

Some embodiments of a center position R3 of the robot in the third quadrant of the global coordinate system: the first predicted position coordinate is P3(xp3, yp3), the first predicted position coordinate is subjected to translational conversion, according to the rigid body connection relationship from trigonometric function relations, to obtain a second predicted position coordinate of the position of the robot center, that is, a current position coordinate R3(xr3, yr3) of the robot center in the third quadrant of the global coordinate system may be approximately expressed by the following example equations:

$$xr3 = \frac{yp3 - xp3 \times \tan(\theta + \theta1)}{\tan\theta1 - \tan(\theta + \theta1)};$$

$$yr3 = xr3 \times \tan\theta1.$$

In addition, if the expected displacement direction of the robot is not the positive direction of the X-axis, that is, the preset direction is not the positive direction of the X-axis, or the optical flow module 7 is not disposed at the bottom right of the robot center, according to thoughts of the example equations based on the fourth quadrant, the center position coordinate of the robot is calculated in conjunction with the corresponding trigonometric function relations. The inventive concepts of their coordinate system conversion methods are the same, so that other embodiments of the above expected displacement direction and the position of the optical flow module 7 are not described herein again.

As some embodiments of the disclosure, the optical flow sensor may improve position accuracy of the robot. However, since the data sensed by the optical flow sensor is not necessarily reliable, data sensed by the code disks is required for performing fusion calculation. Specifically, when an interrupt signal output by the optical flow sensor is at a high level, the data sensed by the optical flow sensor is reliable. When the interrupt signal output by the optical flow sensor is at a low level, the data sensed by the optical flow sensor is unreliable. The interrupt signal is a result obtained by processing the sensed data by means of a built-in algorithm of the optical flow sensor. The built-in algorithm is a common algorithm for processing image data of the carpet surface in the conventional art, so no more elaborations will be made herein.

Figure 6:
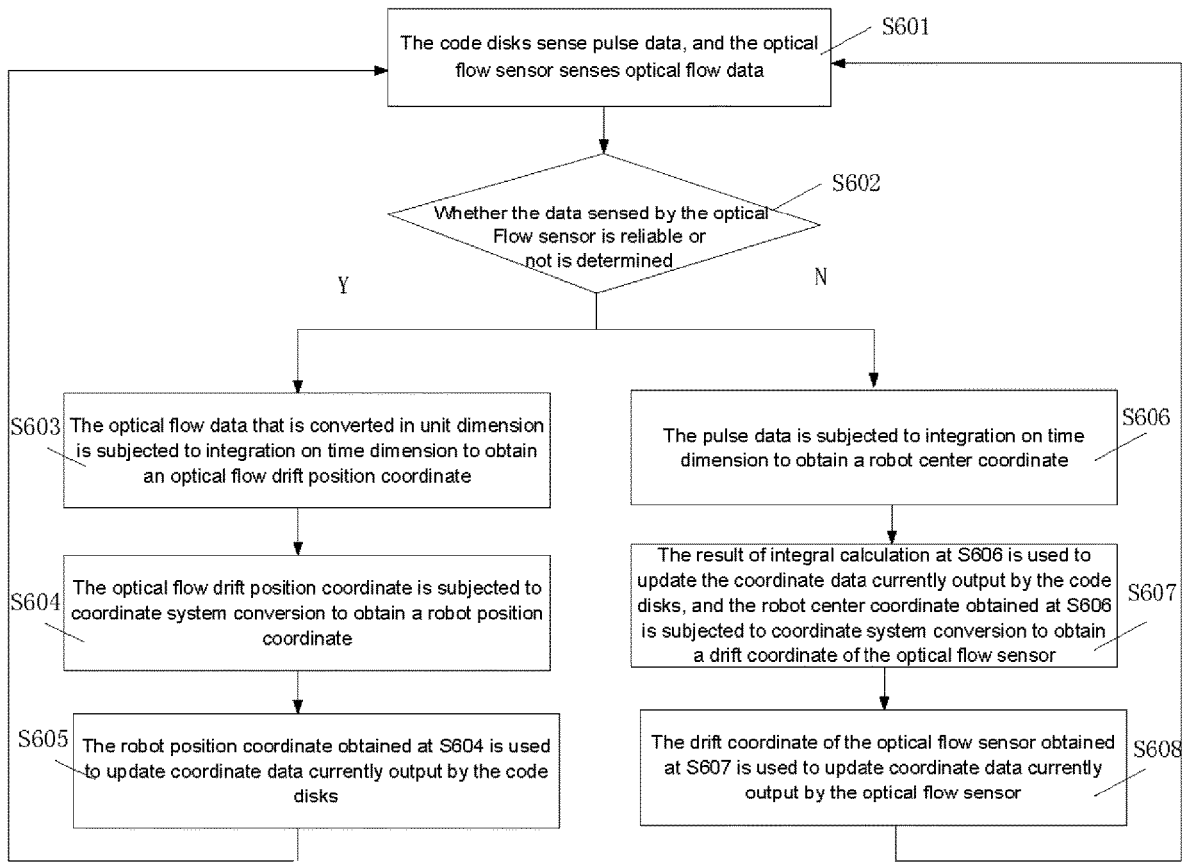
FIG. 6 is a flowchart of a fusion calculation method of data respectively sensed by an optical flow sensor and code disks provided by embodiments of the disclosure.

The fusion calculation at S502 includes the following steps, as shown in FIG. 6.

At S601, the code disks sense pulse data, the optical flow sensor senses optical flow data, and then S602 is executed.

At S602, whether the data sensed by the optical flow sensor is reliable or not is determined, if the determination result is YES, S603 is executed, otherwise, S606 is executed.

At S603, an image displacement acquired by the optical flow sensor in each first preset time is converted to a displacement of the same dimension as the code disks. Specifically, when the optical data is used to update map coordinates, a ratio of a distance value measured by the code disks in a single pulse cycle to a drift value of a relative coordinate of the optical flow sensor in the same pulse cycle is used as a unit conversion factor, which is then multiplied by the optical flow data to obtain values of uniform unit. The data sensed by the optical flow sensor in each first preset time is accumulated to achieve integral calculation on time dimension, so that the optical flow drift position coordinate of the optical flow sensor relative to its initial position is obtained, which corresponds to a measurement result currently output by the optical flow sensor. After that, S604 is executed.

At S604, according to the preceding example equations disclosed based on the rigid connection relationship between the optical flow sensor and the robot center, that is, according to a trigonometric geometrical relationship constructed based on an angle and distance relationship between the robot coordinate system and the optical flow coordinate system, the optical flow drift position coordinate is subjected to translational conversion by the preceding coordinate system conversion method to obtain the robot position coordinate, which corresponds to the actual advancing distance of the drive wheels of the robot on the carpet. After that, S605 is executed.

At S605, the robot position coordinate of the robot, obtained at S604, is used to update coordinate data currently output by the code disks. After that, S601 is executed again. Comparing with the measurement result output by the above code disks before fusion calculation, the result of fusion calculation obtained at this step is much reliable and stable.

At S606, the pulse data sensed by the code disks is subjected to integration on time dimension to obtain the robot center coordinate, the coordinate data may be updated by the robot position coordinate when S605 is executed next time. After that, S607 is executed. Since the code disks record the motion speed of the robot through the number of pulse generated per second, the pulse data sensed by the code disks per first preset time is subjected to integral calculation on time dimension, to obtain the current position coordinate of the robot, which corresponds to the actual advancing distance of the drive wheels of the robot on the carpet.

At S607, the result of integral calculation at S606 is used to update the coordinate data currently output by the code disks. After that, S608 is executed. Before the robot center coordinate at S604 is updated, due to the fact that the robot center coordinate at S604 may be a result of integral conversion of the data sensed by the optical flow sensor when the sensed data is in a reliable stage (the measurement result output when the data sensed by the optical flow sensor is in a reliable stage), accuracy of the measured position coordinate of the robot is guaranteed by the updating operation. Moreover, according to inverse operation equations of the preceding example equations disclosed based on the rigid connection relationship between the optical flow sensor and the robot center, that is, according to a trigonometric geometrical relationship constructed based on an angle and distance relationship between the robot coordinate system and the optical flow coordinate system, the robot center coordinate is subjected to inverse operation by the preceding coordinate system conversion system, to obtain a current drift position coordinate of the optical flow sensor.

At S608, the drift coordinate of the optical flow sensor obtained at S607 is used to update coordinate data currently output by the optical flow sensor. After that, S601 is executed again. Since the optical flow drift position coordinate may be a result of integral calculation on time dimension by accumulating the data sensed by the optical flow sensor, on the condition that the data sensed by the optical flow sensor is unreliable, the machine center coordinate obtained by integration of the pulse data sensed by the code disks at S606 is required to be subjected to translational conversion, the result of translational conversion is used to update the optical flow drift position coordinate obtained by calculation at S603, so as to improve the accuracy of integral calculation of the data sensed by the optical flow sensor when the sensed data is reliable.

In the embodiments of the disclosure, reliability determination is performed through the real-time data sensed by the built-in optical flow sensor and code disks, the data sensed by one type of the sensors is selected, according to a result of the reliability determination of the sensors, to be converted into the optical flow coordinate system, to perform integral calculation to obtain more accurately actual advancing distance of the drive wheels of the robot on the carpet, thereby reducing error in effects of the acting force caused by the carpet drift.

At S503, the amount of drift, relative to the preset direction, of the robot, is calculated according to a relative position relationship between the current position coordinates and the coordinates of the initial position of the robot, then accumulating is performed to obtain a drift statistical value, after that, S504 is executed. The amount of drift refers to a vertical distance between the current position of the robot and a straight line of the preset direction. The robot rotates due to the acting force of the carpet. As shown in FIG. 4, an actual displacement direction OR0 of the robot deviates from an expected displacement direction OM, and the amount of drift of the current position coordinate relative to the expected positive direction of the X-axis is yr-y0. Multiple sets of amount of drift obtained by the calculation above are accumulated to obtain a drift statistical value.

At S504, whether a difference value between a current moment and the initial moment obtained by recording is greater than the second preset time, if the determination result is YES, entering S5, otherwise, returning to S2. In some embodiments of the disclosure, the second preset time is preferably configured to be 500 ms, serving as a detection time for carpet drift of the robot. In the second preset time, as acting forces to the left drive wheel 11 and the right drive wheel 12 of the robot on the carpet surface may be changed by the effects of carpet grain, the carpet drift direction within the second preset time may change continuously, the amount of drift may change between a positive value and a negative value, and therefore it is necessary to acquire multiple sets of amount of drift for accumulation and summation, and then determine the accurate carpet drift direction of the robot within the second preset time. The second preset time refers to the detection time for determining whether the robot has carpet drift or not.

At S505, the number of acquisitions of the position coordinate of the robot within the first preset time is calculated based on the second preset time, and is averaged by the drift statistical value to obtain a drift average value as the amount of drift, after that, S506 is executed. In some embodiments of the disclosure, the second preset time is preferably configured to be 500 ms, the first preset time is preferably configured to be 10 ms, and thus the number of acquisitions of the robot position coordinate within the second preset time is 50, the drift statistical value obtained by accumulating 50 times is averaged to obtain the drift average value as the amount of carpet drift. Drift directions and magnitudes of the robot on the carpet surface are unstable, in the embodiment of the disclosure, the position coordinate acquired every 10 ms is sampled 50 times, and then accumulated to obtain a determined amount of carpet drift in 500 ms, so that robustness of the identification method is improved. Further, since the optical flow data of the optical flow sensor and the statical value obtained by accumulating 50 times are adopted for obtaining of the amount of carpet drift, interference from error variables may be existed; therefore, in order to improve detection accuracy of the identification method, the drift statistical value is required to be averaged to obtain an average value. The whole data operation is simple, and the amount of carpet drift, which is relatively accurate, may be easily obtained. Specifically, the deviation extent from the preset direction to the current motion direction of the robot is determined according to the drift average value. Correspondingly, the positive and negative of the drift average value is related to the coordinate axis direction from which the robot deviates in the global coordinate system. The drift average value determines the deviation magnitude of the robot from the preset direction to the current motion direction.

Further, the amount of drift, the drift statistical value, and the number of acquisitions are initialized to zero at the initial moment. The first preset time refers to the time for each fusion calculation; the second preset time refers to the detection time to determine whether the robot has carpet drift or not; and both the coordinates of the initial position and the current position of the robot are global coordinates.

At S506, according to a deviation value corresponding to the absolute value of the drift average value, a corresponding PID proportionality coefficient is set to synchronously adjust speeds of the left and right drive wheels of the robot, so that the robot is corrected from the current motion direction to the preset direction to continue to linearly move.

Specifically, if it is determined that the current motion direction of the robot deviates from the preset direction, the robot is controlled to execute the following steps: when the drift average value $\bar{y}$ is a positive number, the control mainboard 2 determines that the robot drifts to the positive direction of the Y-axis of the global coordinate system, the drift magnitude is equal to the drift average value, the control mainboard 2 inputs the drift average value into a built-in PID adjusting system, to set a corresponding PID proportionality coefficient P1 according to a deviation value generated from the drift average value, so as to synchronously adjust the speeds of the left and right drive wheels of the robot. Moreover, based on detection angles of the gyroscope, another PID proportionality coefficient P2 is set to reduce the deviation angle of the robot, so that the robot is corrected from the current motion direction to the preset direction to continue to perform linear motion. In the correction process, accumulation of deviations is reduced, and the turning speed of the robot is changed.

When the drift average value $\bar{y}$ is a negative number, the control mainboard 2 determines that the robot drifts to the negative direction of the Y-axis of the global coordinate system, the drift magnitude is equal to the absolute value of the drift average value, the control mainboard 2 inputs the drift average value into a built-in PID adjusting system, to set a corresponding PID proportionality coefficient P1, according to a deviation value generated from the drift average value, so as to synchronously adjust the speeds of the left and right drive wheels of the robot. Moreover, based on a detection angle θ of the gyroscope, another PID proportionality coefficient P2 is set to reduce the deviation angle of the robot, so that the robot overcomes the amount of drift caused by the acting force from the carpet and continues to stably perform linear motion in the preset direction. In the correction process, accumulation of deviations is reduced, and the turning speed of the robot is changed.

Figure 3:
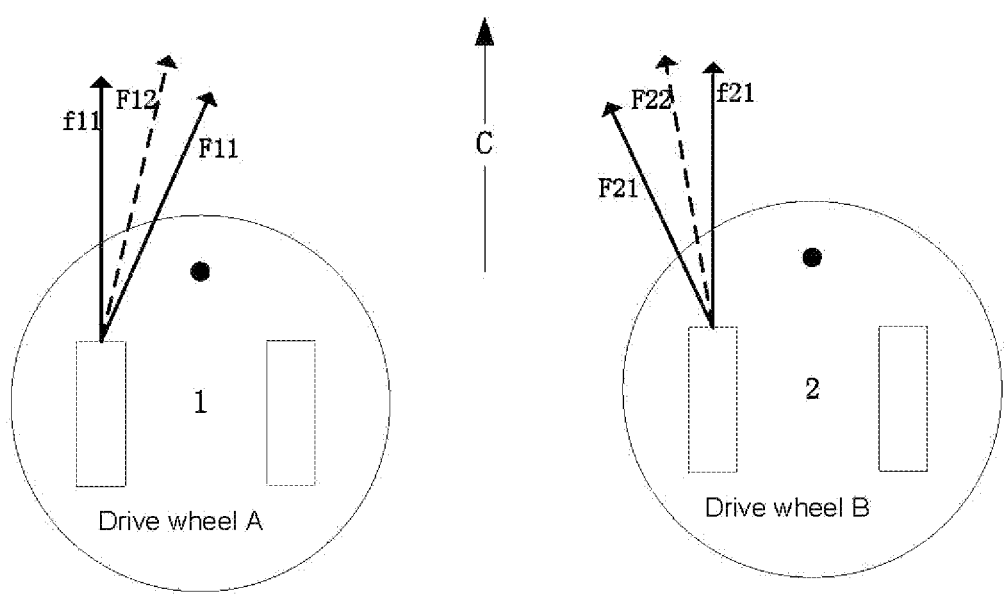
FIG. 3 is a schematic top view of force analysis of wheels of a robot on a carpet in embodiments of the disclosure.

As some embodiments, according to angle change of the gyroscope, a drift angle and a drift direction of the robot on the carpet surface is determined, namely an angle difference measured, by the gyroscope, at the current position coordinate and the initial position coordinate of the robot. In some embodiments of the disclosure, as shown in FIG. 3, when the drift average value is a positive number, it is determined that the robot deviates to the positive direction of the Y-axis of the global coordinate system, and the drift magnitude is equal to the drift average value. Further, in conjunction with the angle change measured by the gyroscope, the angle at which the robot deviates to the positive direction of the Y-axis of the global coordinate system may be obtained, so that a resultant vector value of the acting forces to the robot from the carpet is determined. When the drift average value is a negative number, it is determined that the robot deviates to the negative direction of the Y-axis of the global coordinate system, and the drift magnitude is equal to the absolute value of the drift average value. Further, in conjunction with the angle change measured by the gyroscope, the angle at which the robot deviates to the negative direction of the Y-axis of the global coordinate system may be obtained, so that a resultant vector value of the acting forces to the robot from the carpet is determined. If the expected displacement direction is the positive direction of the X-axis of the global coordinate system, the positive and negative of the drift average value is related to the coordinate axis direction from which the robot deviates in the global coordinate system.

As some embodiments of the disclosure, when the drift average value $\bar{y}$ is a positive number, if the expected displacement direction of the robot is determined to be the positive direction of the X-axis of the global coordinate system, it can be determined that the current motion direction of the robot deviates to the positive direction of the Y-axis of the global coordinate system. A method for synchronously adjusting the speed of the left and right drive wheels of the robot includes: the speed V1 of the left drive wheel of the robot is controlled to plus an absolute value $\bar{y}$ of the drift average value, the speed Vr of the right drive wheel of the robot is controlled to minus an absolute value $\bar{y}$ of the drift average value, so that the speed of the left drive wheel is greater than that of the right drive wheel, the robot turns to the negative direction of the Y-axis of the global coordinate system, and the current motion direction of the robot gradually approaches the preset direction. In conjunction with the detection angle θ of the gyroscope, it can be determined that a deviation made by the robot is $$T = P1*[(V1 + -\bar{y}) - (Vr--\bar{y})] + P2*\theta.$$

The robot is controlled to execute the identification method. When the robot turns to the negative direction of the Y-axis of the global coordinate system due to a speed difference of the left and right drive wheels, the drift average value gradually decreases and tends to 0, the current motion direction of the robot and the preset direction gradually coincide, the speed of the left drive wheel of the robot is equal to that of the right drive wheel of the robot again, so that accumulation of deviations of the robot is reduced.

As some other embodiments of the disclosure, when the drift average value $\bar{y}$ is a negative number, if the expected displacement direction of the robot is determined to be the positive direction of the X-axis of the global coordinate system, it can be determined that the current motion direction of the robot deviates to the negative-direction of the Y-axis of the global coordinate system. A method for synchronously adjusting the speed of the left and right drive wheels of the robot includes: the speed V1 of the left drive wheel of the robot is controlled to minus the absolute value $-\bar{y}$ of the drift average value, the speed Vr of the right drive wheel of the robot is controlled to plus the absolute value $-\bar{y}$ of the drift average value, so that the speed of the left drive wheel is greater than that of the right drive wheel, the robot turns to the positive direction of the Y-axis of the global coordinate system, and the current motion direction of the robot gradually approaches the preset direction. In conjunction with the detection angle θ of the gyroscope, it can be determined that a deviation made by me room is $$T = P1*[(Vr--\bar{y}) - (V1 + -\bar{y})] + P2*\theta.$$

The robot is controlled to execute the identification method. When the robot turns to the positive direction of the Y-axis of the global coordinate system due to a speed difference of the left and right drive wheels, the drift average value gradually decreases and tends to 0, the current motion direction of the robot and the preset direction gradually coincide, the speed of the left drive wheel of the robot is equal to that of the right drive wheel of the robot again, so that accumulation of deviations of the robot is reduced.

In order to adjust the speed of the right wheel of the robot, it is necessary to input different Pulse-Width Modulation (PWM) drive signals to a motor of the right drive wheel. Therefore, based on a PID control algorithm, in order to achieve a better adjustment effect, it is necessary to obtain in advance the control speed and sampling speed of the right drive wheel of the robot at the current moment and two moment adjacent to and before the current moment. For example, the control speed and sampling speed at the current moment and 1 second before the current moment and 2 seconds before the current moment are obtained. The control speed is data output by the system, and the sampling speed is data detected by the code disks. Due to influences of an external environment, the actual sampling speed is deviated from the control speed output by the system. Therefore, after the error data at two different moments is determined, in conjunction with the PID value, a voltage value that is input to the right drive wheel to adjust the speed of the right drive wheel can be accurately obtained. Herein, values of P, I and D are obtained through a limited number of experiments, tests, and summaries of the robot, and each is a constant. The method described in the embodiments, through the PID control algorithm, can accurately obtain the voltage value, output to the right driving wheel, of the motor, and has high control accuracy and good control effect.

A chip is configured to store a program. The program is configured to control the robot to execute the control method, so that the root can achieve intelligent cleaning on the carpet surface to improve cleaning efficiency. The chip determines, through an optical flow sensor, a gyroscope and code disks, initial position information (X1, Y1, θ1) of a straight line to be walked in and specific current position information (X2, Y2, θ2) in a walking process of the robot, and then determines whether walking of the robot deviates from the straight line according to a difference between an angle θ1 in the initial position information and an angle θ2 in the current position information, and a vertical distance of the current position deviating from the straight line where the preset direction lies. If there is a deviation, speeds of drive wheels of the robot is adjusted to drive the robot to return to the straight line.

A cleaning robot is disclosed. The cleaning robot is a robot for cleaning the carpet surface. In some embodiments of the disclosure, the robot moving on the carpet may be a cleaning robot. Motion parameters of the cleaning robot on the carpet may be dynamically adjusted by the identification method, which is conductive to adjusting cleaning spacing on the surface or at the edge of carpets made of different materials. In addition, through a built-in PID adjusting system of the cleaning robot, the cleaning robot is corrected to linear motion from carpet drift so as to complete cleaning along an edge.

The method determines, through an optical flow sensor, a gyroscope and code disks, initial position information (X1, Y1, θ1) of a straight line in which the robot to be walked and specific current position information (X2, Y2, θ2) in a walking process of the robot, and then determines whether walking of the robot deviates from the straight line according to a difference between an angle θ1 in the initial position information and an angle θ2 in the current position information, and a vertical distance of the current position deviating from the straight line in which the robot to be walked. If there is a deviation, speeds of the drive wheels of the robot are adjusted to drive the robot to return to an expected displacement direction. According to the method for controlling the robot to walk in a straight line, whether the robot walking on the carpet deviates from the expected displacement direction or not may be determined through detection data of the optical flow sensor and the code disks and by infusion of the data; the robot may be effectively controlled to correct the deviation according to deviation values, so as to maintain a good linear walking effect, with relatively low cost. Moreover, related data about deviation detection and correction is accurate, data computation processing is quite simple, high-performance processors are not required, so that system computation resources and hardware cost of the processors are reduced further.

For the cleaning robot provided with the chip as a control chip, whether the cleaning robot deviates in walking may be determined only through the data sensed by the optical flow sensor and the code disks; in addition, the robot may be effectively controlled to correct the deviation according to the deviation values, so as to maintain a good linear walking effect, with relatively low cost. Moreover, related data about deviation detection and correction is clear, data computation processing is quite simple, high-performance processors are not required, so that system computation resources and hardware cost of the robot are reduced further.

The above various embodiments are only used to illustrate the technical solutions of the disclosure and not to limit them; although the disclosure has been described in detail with reference to the preferred various embodiments, those of ordinary skill in the art should understand that modifications to the technical solutions described by the preceding various embodiments or equivalent replacements to a part or all of the technical features can still be made; all of the modifications and replacements shall not cause the essence of the corresponding technical solutions to be departed from the scope of the various technical solutions of the disclosure.

What is claimed is:

1. A control method for carpet drift in robot motion, wherein the robot begins to linearly move on a carpet surface from an initial position, coordinates sensed by the robot are required to be converted into a global coordinate system, and the control method comprises:

S1, determining a preset direction in which the robot linearly moves on the carpet surface, wherein the preset direction is a positive direction of a preset coordinate axis of the global coordinate system, and recording an initial position coordinate and an initial moment of the robot simultaneously, and entering S2;

S2, performing, every first preset time, fusion calculation on data sensed by an optical flow sensor and data sensed by code disks, to obtain a current position coordinate of the robot, which corresponds to an actual advancing distance of drive wheels of the robot, and entering S3, S3, calculating an amount of drift of a current direction of motion relative to the preset direction, of the robot, according to a relative position relationship between the current position coordinate and the initial position coordinate of the robot, then accumulating the amount of drifts of current directions of motion relative to the preset direction to obtain a drift statistical value, and entering S4, wherein the amount of drift refers to a distance between a current position of the robot and a straight line where the preset direction lies in;

S4, determining whether a difference between a current moment and the initial moment is greater than a second preset time or not, when the difference between the current moment and the initial moment is greater than the second preset time, entering S5, otherwise, returning to S2;

S5, based on a time interval of data sensing at the first preset time, calculating a number of acquisitions of position coordinates within the second preset time, and using the drift statistical value to average the number of acquisitions to obtain a drift average value as an amount of carpet drift, wherein a positive and a negative of the drift average value is related to a coordinate axis direction from which the robot deviates in the global coordinate system, and the drift average value determines a magnitude of a current motion direction of the robot deviates from the preset direction; after that, entering S6; and S6, according to a difference value corresponding to an absolute value of the drift average value, setting a corresponding proportional-integral-derivative (PID) proportionality coefficient to synchronously adjust a speeds of left drive wheel of the robot and a speed of right drive wheel of the robot, so that the robot is corrected from the current motion direction to the preset direction to continue to linearly move, wherein the amount of drift, the drift statistical value, and the number of acquisitions are all initialized to be zero at the initial moment; the first preset time refers to a time for each fusion calculation, the second preset time refers to a detection time to determine carpet drift occurred to the robot; and both the coordinates of the initial position and the current position of the robot are global coordinates, the coordinates sensed by the robot is sensed by the optical flow sensor, before S1, the speed of the left drive wheel of the robot is equal to that of the right drive wheel of the robot.

2. The control method according to claim 1, wherein the control method further comprises, according to an angle change of a gyroscope, determining a drift angle and a drift direction of the robot on a carpet surface, namely the drift angel of the robot is an angle measured at the current position coordinate and the initial position coordinate.

3. The control method according to claim 1, wherein before S1 is executed, the speed of the left drive wheel of the robot is equal to the speed of the right drive wheel of the robot.

4. The control method according to claim 1, wherein at S2, a process of the fusion calculation comprises:

when the data sensed by the optical flow sensor is reliable, first converting an image displacement acquired by the optical flow sensor in each first preset time into a displacement of a same dimension as the code disks, and accumulating and integrating the data sensed by the optical flow sensor on time dimension to obtain an optical flow drift position coordinate of the optical flow sensor relative to an initial position of the optical flow sensor; then transferring the optical flow drift position coordinate to obtain a machine center coordinate of the current position according to a rigid connection relationship between the optical flow sensor and a robot center, a machine center coordinate of the current position is the current position coordinate of the robot, which corresponds to an actual advancing distance of the drive wheels of the robot on the carpet;

when the data sensed by the optical flow sensor is not reliable, integrating pulse data sensed by the code disks within each first preset time on the time dimension to obtain a calculation result, and using the calculation result to update a machine center coordinate, so that obtaining the current position coordinate of the robot, which corresponds to an actual advancing distance of the drive wheels of the robot on the carpet;

moreover, transferring the machine center coordinate according to a rigid connection relationship between the optical flow sensor and the robot center to obtain a translated coordinate, and using the translated coordinate to update an optical flow drift position coordinate;

wherein a reliability of the data sensed by the optical flow sensor is determined by a built-in drive signal of the optical flow sensor; when an interrupt signal output by the optical flow sensor is at a high level, the data sensed by the optical flow sensor is reliable; and when the interrupt signal output by the optical flow sensor is at a low level, the data sensed by the optical flow sensor is unreliable.

5. The control method according to claim 4, wherein the rigid connection relationship refers to a relative position relationship between an optical flow coordinate system of the optical flow sensor and a machine coordinate system of the robot center, and includes a distance between a position of the optical flow sensor and a robot center position, and an included angle between a line from the position of the optical flow sensor to the position of the robot center, and a preset coordinate axis of the machine coordinate system, wherein the positive direction of the preset coordinate axis of the machine coordinate system is the current motion direction of the robot; an included angle between the positive direction of the preset coordinate axis of the machine coordinate system and the positive direction of the preset coordinate axis of the global coordinate system is obtained by calculation based on detection values of the gyroscope, and is used as a deviation angle of the robot at the current position relative to the preset direction.

6. The control method according to claim 1, wherein at S5, the number of acquisitions refers to a ratio of the second preset time to the first preset time.

7. The control method according to claim 1, wherein when the drift average value is a positive number a process of synchronously adjusting the speed of the left drive wheel and the speed of right drive wheel of the robot comprises: the speed of the left drive wheel of the robot is controlled to plus the absolute value of the drift average value, the speed of the right drive wheel of the robot is controlled to minus the absolute value of the drift average value, and the robot is controlled to detect the drift average value in real time, until the drift average value gradually decreases and tends to 0, the current motion direction of the robot and the preset direction gradually coincide, and the speed of the left drive wheel of the robot is equal to that of the right drive wheel of the robot again:

when the drift average value is a negative number, a process of synchronously adjusting the speed of the left drive wheel and the speed of right drive wheel of the robot comprises: the speed of the left drive wheel of the robot is controlled to minus the absolute value of the drift average value, the speed of the right drive wheel of the robot is controlled to plus the absolute value of the drift average value, and the robot is controlled to detect the drift average value in real time; until the drift average value gradually decreases and tends to 0, the current motion direction of the robot and the preset direction gradually coincide, and the speed of the left drive wheel of the robot is equal to that of the right drive wheel of the robot again.

8. A chip, configured to store a program, wherein the program is configured to control a robot to execute a control method, wherein the robot begins to linearly move on a carpet surface from an initial position, coordinates sensed by the robot are required to be converted into a global coordinate system, and the control method comprises:

S1, determining a preset direction in which the robot linearly moves on the carpet surface, wherein the preset direction is a positive direction of a preset coordinate axis of the global coordinate system, and recording an initial position coordinate and an initial moment of the robot simultaneously, and entering S2;

S2, performing, every first preset time, fusion calculation on data sensed by an optical flow sensor and data sensed by code disks, to obtain a current position coordinate of the robot, which corresponds to an actual advancing distance of drive wheels of the robot, and entering S3;

S3, calculating an amount of drift of a current direction of motion, relative to the preset direction, of the robot, according to a relative position relationship between the current position coordinate and the initial position coordinate of the robot, then accumulating the amount of drifts of current directions of motion relative to the preset direction to obtain a drift statistical value, and entering S4, wherein the amount of drift refers to a distance between a current position of the robot and a straight line where the preset direction lies in;

S4, determining whether a difference between a current moment and the initial moment is greater than a second preset time or not, when the difference between the current moment and the initial moment is greater than the second preset time, entering S5, otherwise, returning to S2;

S5, based on a time interval of data sensing at the first preset time, calculating a number of acquisitions of position coordinates within the second preset time, and using the drift statistical value to average the number of acquisitions to obtain a drift average value as an amount of carpet drift, wherein a positive and a negative of the drift average value is related to a coordinate axis direction from which the robot deviates in the global coordinate system, and the drift average value determines a magnitude of a current motion direction of the robot deviates from the preset direction; after that, entering S6; and S6, according to a difference value corresponding to an absolute value of the drift average value, setting a corresponding proportional-integral-derivative (PID) proportionality coefficient to synchronously adjust a speed of left drive wheel of the robot and a speed of right drive wheel of the robot, so that the robot is corrected from the current motion direction to the preset direction to continue to linearly move, wherein the amount of drift, the drift statistical value, and the number of acquisitions are all initialized to be zero at the initial moment; the first preset time refers to a time for each fusion calculation; the second preset time refers to a detection time to determine carpet drift occurred to the robot; and both the coordinates of the initial position and the current position of the robot are global coordinates, the coordinates sensed by the robot is sensed by the optical flow sensor, before S1, the speed of the left drive wheel of the robot is equal to that of the right drive wheel of the robot.

9. A cleaning robot, wherein the cleaning robot is a robot for cleaning a carpet surface, and the chip according to claim 8 is built in the cleaning robot.

10. The control method according to claim 2, wherein when the drift average value is a positive number, a process of synchronously adjusting the speed of the left drive wheel and the speed of right drive wheel of the robot comprises; the speed of the left drive wheel of the robot is controlled to plus the absolute value of the drift average value, the speed of the right drive wheel of the robot is controlled to minus the absolute value of the drift average value, and the robot is controlled to detect the drift average value in real time; until the drift average value gradually decreases and tends to 0, the current motion direction of the robot and the preset direction gradually coincide, and the speed of the left drive wheel of the robot is equal to that of the right drive wheel of the robot again;

when the drift average value is a negative number, a process of synchronously adjusting the speed of the left drive wheel and the speed of right drive wheel of the robot comprises: the speed of the left drive wheel of the robot is controlled to minus the absolute value of the drift average value, the speed of the right drive wheel of the robot is controlled to plus the absolute value of the drift average value, and the robot is controlled to execute the identification method; until the drift average value gradually decreases and tends to 0, the current motion direction of the robot and the preset direction gradually coincide, and the speed of the left drive wheel of the robot is equal to that of the right drive wheel of the robot again.

11. The control method according to claim 3, wherein when the drift average value is a positive number, a process of synchronously adjusting the speed of the left drive wheel and the speed of right drive wheel of the robot comprises: the speed of the left drive wheel of the robot is controlled to plus the absolute value of the drift average value, the speed of the right drive wheel of the robot is controlled to minus the absolute value of the drift average value, and the robot is controlled to detect the drift average value in real time; until the drift average value gradually decreases and tends to 0, the current motion direction of the robot and the preset direction gradually coincide, and the speed of the left drive wheel of the robot is equal to that of the right drive wheel of the robot again;

when the drift average value is a negative number, a process of synchronously adjusting the speed of the left drive wheel and the speed of right drive wheel of the robot comprises: the speed of the left drive wheel of the robot is controlled to minus the absolute value of the drift average value, the speed of the right drive wheel of the robot is controlled to plus the absolute value of the drift average value, and the robot is controlled to execute the identification method; until the drift average value gradually decreases and tends to 0, the current motion direction of the robot and the preset direction gradually coincide, and the speed of the left drive wheel of the robot is equal to that of the right drive wheel of the robot again.

12. The control method according to claim 4, wherein when the drift average value is a positive number, a process of synchronously adjusting the speed of the left drive wheel and the speed of right drive wheel of the robot comprises: the speed of the left drive wheel of the robot is controlled to plus the absolute value of the drift average value, the speed of the right drive wheel of the robot is controlled to minus the absolute value of the drift average value, and the robot is controlled to detect the drift average value in real time: until the drift average value gradually decreases and tends to 0, the current motion direction of the robot and the preset direction gradually coincide, and the speed of the left drive wheel of the robot is equal to that of the right drive wheel of the robot again;

when the drift average value is a negative number, a process of synchronously adjusting the speed of the left drive wheel and the speed of right drive wheel of the robot comprises: the speed of the left drive wheel of the robot is controlled to minus the absolute value of the drift average value, the speed of the right drive wheel of the robot is controlled to plus the absolute value of the drift average value, and the robot is controlled to execute the identification method; until the drift average value gradually decreases and tends to 0, the current motion direction of the robot and the preset direction gradually coincide, and the speed of the left drive wheel of the robot is equal to that of the right drive wheel of the robot again.

13. The control method according to claim 5, wherein when the drift average value is a positive number, a process of synchronously adjusting the speed of the left drive wheel and the speed of right drive wheel of the robot comprises: the speed of the left drive wheel of the robot is controlled to plus the absolute value of the drift average value, the speed of the right drive wheel of the robot is controlled to minus the absolute value of the drift average value, and the robot is controlled to detect the drift average value in real time: until the drift average value gradually decreases and tends to 0, the current motion direction of the robot and the preset direction gradually coincide, and the speed of the left drive wheel of the robot is equal to that of the right drive wheel of the robot again;

when the drift average value is a negative number, a process of synchronously adjusting the speed of the left drive wheel and the speed of right drive wheel of the robot comprises: the speed of the left drive wheel of the robot is controlled to minus the absolute value of the drift average value, the speed of the right drive wheel of the robot is controlled to plus the absolute value of the drift average value, and the robot is controlled to execute the identification method; until the drift average value gradually decreases and tends to 0, the current motion direction of the robot and the preset direction gradually coincide, and the speed of the left drive wheel of the robot is equal to that of the right drive wheel of the robot again.

14. The control method according to claim 6, wherein when the drift average value is a positive number, a process of synchronously adjusting the speed of the left drive wheel and the speed of right drive wheel of the robot comprises: the speed of the left drive wheel of the robot is controlled to plus the absolute value of the drift average value, the speed of the right drive wheel of the robot is controlled to minus the absolute value of the drift average value, and the robot is controlled to detect the drift average value in real time, until the drift average value gradually decreases and tends to 0, the current motion direction of the robot and the preset direction gradually coincide, and the speed of the left drive wheel of the robot is equal to that of the right drive wheel of the robot again:

when the drift average value is a negative number, a process of synchronously adjusting the speed of the left drive wheel and the speed of right drive wheel of the robot comprises: the speed of the left drive wheel of the robot is controlled to minus the absolute value of the drift average value, the speed of the right drive wheel of the robot is controlled to plus the absolute value of the drift average value, and the robot is controlled to execute the identification method; until the drift average value gradually decreases and tends to 0, the current motion direction of the robot and the preset direction gradually coincide, and the speed of the left drive wheel of the robot is equal to that of the right drive wheel of the robot again.

15. The chip according to claim 8, wherein the control method further comprises, according to an angle change of a gyroscope, determining a drift angle and a drift direction of the robot on a carpet surface, namely the drift angel of the robot is an angle measured at the current position coordinate and the initial position coordinate.

16. The chip according to claim 8, wherein before S1 is executed, the speed of the left drive wheel of the robot is equal to the speed of the right drive wheel of the robot.

17. The chip according to claim 8, wherein at S2, a process of the fusion calculation comprises:

when the data sensed by the optical flow sensor is reliable, first converting an image displacement acquired by the optical flow sensor in each first preset time into a displacement of a same dimension as the code disks, and accumulating and integrating the data sensed by the optical flow sensor on time dimension to obtain an optical flow drift position coordinate of the optical flow sensor relative to an initial position of the optical flow sensor; then transferring the optical flow drift position coordinate to obtain a machine center coordinate of the current position according to a rigid connection relationship between the optical flow sensor and a robot center, a machine center coordinate of the current position is the current position coordinate of the robot, which corresponds to an actual advancing distance of the drive wheels of the robot on the carpet;

when the data sensed by the optical flow sensor is not reliable, integrating pulse data sensed by the code disks within each first preset time on the time dimension to obtain a calculation result, and using the calculation result to update a machine center coordinate, so that obtaining the current position coordinate of the robot, which corresponds to an actual advancing distance of the drive wheels of the robot on the carpet; moreover, transferring the machine center coordinate according to a rigid connection relationship between the optical flow sensor and the robot center to obtain a translated coordinate, and using the translated coordinate to update an optical flow drift position coordinate;

wherein a reliability of the data sensed by the optical flow sensor is determined by a built-in drive signal of the optical flow sensor; when an interrupt signal output by the optical flow sensor is at a high level, the data sensed by the optical flow sensor is reliable; and when the interrupt signal output by the optical flow sensor is at a low level, the data sensed by the optical flow sensor is unreliable.

18. The chip according to claim 17, wherein the rigid connection relationship refers to a relative position relationship between an optical flow coordinate system of the optical flow sensor and a machine coordinate system of the robot center, and includes a distance between a position of the optical flow sensor and a robot center position, and an included angle between a line from the position of the optical flow sensor to the position of the robot center, and a preset coordinate axis of the machine coordinate system, wherein the positive direction of the preset coordinate axis of the machine coordinate system is the current motion direction of the robot; an included angle between the positive direction of the preset coordinate axis of the machine coordinate system and the positive direction of the preset coordinate axis of the global coordinate system is obtained by calculation based on detection values of the gyroscope, and is used as a deviation angle of the robot at the current position relative to the preset direction.

19. The chip according to claim 8, wherein at S5, the number of acquisitions refers to a ratio of the second preset time to the first preset time.

20. The chip according to claim 8, wherein when the drift average value is a positive number, a process of synchronously adjusting the speed of the left drive wheel and the speed of right drive wheel of the robot comprises: the speed of the left drive wheel of the robot is controlled to plus the absolute value of the drift average value, the speed of the right drive wheel of the robot is controlled to minus the absolute value of the drift average value, and the robot is controlled to detect the drift average value in real time; until the drift average value gradually decreases and tends to 0, the current motion direction of the robot and the preset direction gradually coincide, and the speed of the left drive wheel of the robot is equal to that of the right drive wheel of the robot again;

when the drift average value is a negative number, a process of synchronously adjusting the speed of the left drive wheel and the speed of right drive wheel of the robot comprises: the speed of the left drive wheel of the robot is controlled to minus the absolute value of the drift average value, the speed of the right drive wheel of the robot is controlled to plus the absolute value of the drift average value, and the robot is controlled to execute the identification method; until the drift average value gradually decreases and tends to 0, the current motion direction of the robot and the preset direction gradually coincide, and the speed of the left drive wheel of the robot is equal to that of the right drive wheel of the robot again.

* * * * *